June 4, 1963  B. L. A. VAN DER SCHEE  3,092,562
NUCLEAR FISSION REACTION PROCESS
Filed June 25, 1956
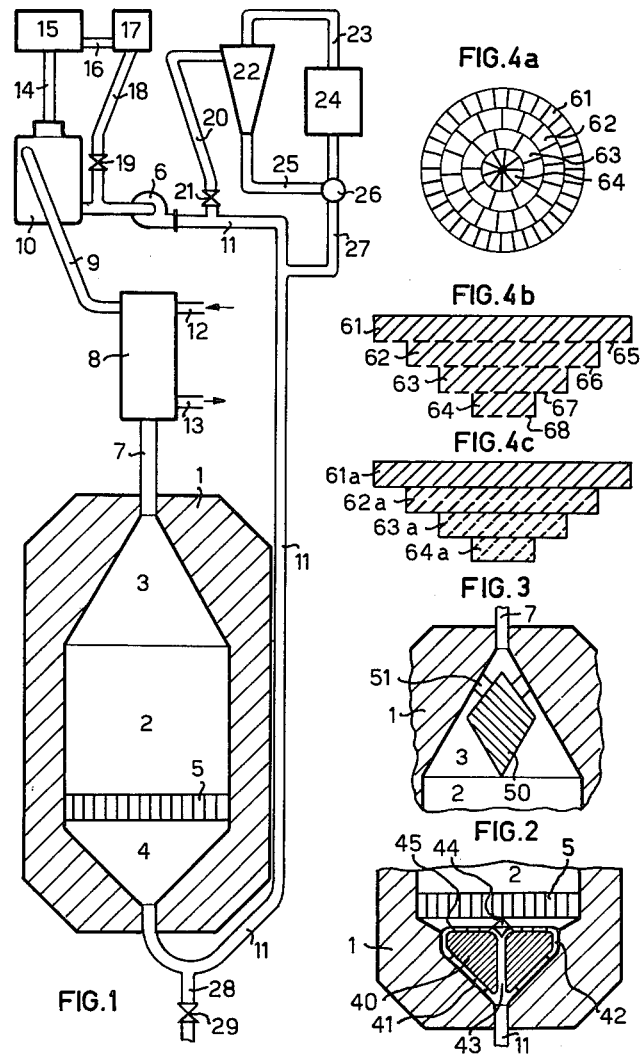
BERNARD L. A. VAN DER SCHEE
INVENTOR
BY: Cushman, Darby & Cushman
ATTORNEYS United States Patent Office 3,092,562
Patented June 4, 1963

3,092,562
NUCLEAR FISSION REACTION PROCESS
Bernard L. A. van der Schee, Arnhem, Netherlands, assignor to Stichting Reactor Centrum Nederland
Filed June 25, 1956, Ser. No. 593,672
Claims priority, application Netherlands June 25, 1955
3 Claims. (Cl. 204—154.2)

The present invention relates to a process for the establishment of a self-sustaining neutron chain fission reaction wherein the nuclear fuel, in the form of a rapidly settling suspension of a solid fissile or fertile material in a carrier liquid, is circulated through a nuclear reactor with the object of removing the heat developed in the nuclear reactor and—if desired—to enable a continuous purification of the nuclear fuel to be carried out during the operation of the nuclear reactor.

Furthermore the invention relates to a nuclear reactor suited for realizing said process.

The above-mentioned process, as previously proposed, is especially suited for application with the so-called thermal power nuclear reactors, as is the case with that process for the establishment of a self-sustaining neutron chain fission reaction in a system comprising a solution of fissile material in a carrier liquid having a low neutron capture cross section, and that because the said suspension may be circulated through the nuclear reactor applied and through a heat exchanger, where the heat is conferred to a secondary coolant, e.g., water, so that the nuclear fuel suspension simultaneously acts as its own coolant, and the application of a separate coolant may be dispensed with.

In the process as hereinbefore indicated there may be used as the solid fissile material uranium oxides or other insoluble solids comprising substances capable of giving rise to divergent nuclear chain fission reactions, e.g., thorium oxide.

As the carrier liquid there may be advantageously applied liquids capable of slowing down, or moderating, fast fission neutrons into slow or thermal neutrons, e.g., common water or heavy water.

In the present process, known principles are applied in relation to the determination of the critical size of the uraniferous mass in combination with moderating and neutron-reflecting material within the nuclear reactor.

It should be understood that in those cases where the nuclear fuel suspension circulates through the nuclear reactor and through a heat exchanger, there are no critical conditions whatsoever in the circulation system, heat exchanger included, outside of the nuclear reactor, so that the occurrence of nuclear fission is substantially confined to the space within the nuclear reactor proper.

When a homogeneous suspension-reactor is used, it is required, in order to obtain a good operation, that the concentration distribution of the suspended material present within the space, e.g., a reactor core or a blanket, in which the self-sustaining nuclear chain fission reaction is established—hereinafter and in the claims hereof generally called the reactor vessel—can be controlled.

Primarily, the concentration of the suspended fissile or fertile material must be uniform throughout the reactor vessel. However, such a homogeneous distribution is difficult to obtain, as particles of the usual fissile or fertile materials tend to settle rapidly on account of their high specific gravity. This tendency is all the more marked at the high temperatures prevailing within the nuclear reactor, as a result of the decreased viscosity of the carrier liquid.

The obvious application of stirrers or suchlike devices with moving parts within the reactor vessel is attended with great difficulties in practice, as regular maintenance and repair at short notice is difficult or even impossible, as a result of the intense radiation inside the nuclear reactor.

In the co-pending Went et al. application, Serial No. 495,024, filed March 17, 1955, now abandoned, there is described a process whereby the aforementioned and other disadvantages are obviated and in which a reactor vessel with substantially vertical inner walls is used and the nuclear fuel suspension is led in a continuous downward flow through the reactor vessel, in such a manner that turbulence in the carrier liquid is avoided and the suspended solid particles can freely settle with respect to the descending carrier liquid.

According to the said application the nuclear fuel suspension is preferably made to flow from a feed chamber located over the reactor vessel, whose lower end has substantially the same diameter as said vessel, in a number of vertical partial currents into the reactor vessel.

In the above mentioned process the carrier liquid descends at a rate which is substantially uniform throughout any horizontal cross-section of the reactor vessel, while the suspended particles obtain, almost immediately after the suspension has entered the reactor vessel, a constant settling rate with respect to the carrier liquid. The result is that, if the concentration of the nuclear fuel suspension supplied is constant and the rates of feed and discharge of the suspension are likewise constant, there will exist a stationary state within the reactor vessel, wherein the concentration of the nuclear fuel suspension is uniform throughout the reactor vessel.

It has appeared that with the above-mentioned process the occurrence of inhomogeneities in the nuclear fuel suspension within the reactor vessel is not absolutely excluded which phenomenon entails that the concentration of the solid fissile or fertile material is not exactly uniform throughout the reactor vessel.

It is the main object of the present invention to provide an improved process of the kind specified in which considerably better results may be obtained as regards the uniformity of the nuclear fuel suspension concentration throughout the nuclear reactor vessel.

A further object is to provide such process in which the inventory of fissile or fertile material in the suspension circulation system outside the nuclear reactor is substantially smaller than in the process described in the said co-pending Went et al. application.

Further objects and the entire scope of applicability of the present invention will become apparent from the detailed description given hereinafter, in the annexed drawing and in the appertaining claims. It should be understood, however, that the detailed description is given by way of illustration and not of limitation.

According to the invention, in a process of the kind specified, the nuclear fuel suspension is led in a continuous upward flow through a reactor vessel with substantially vertical innerwalls in such a manner that turbulence in the carrier liquid is avoided and the suspended solid particles can freely settle with respect to the ascending carrier liquid.

The essential difference between the present process and the process described in the abovementioned Went et al. application is in the feature that the nuclear fuel suspension traverses the reactor vessel in upward flow whereas in the said earlier process the suspension traverses the reactor vessel in downward flow.

In the present process, the carrier liquid ascends at a rate which is substantially uniform throughout any horizontal cross section of the reactor vessel, while the suspended particles obtain, almost immediately after the suspension has entered the reactor vessel at the lower end thereof, a constant settling rate with respect to the carrier liquid. The result is that, if the concentration of the nuclear fuel supplied is constant and the rates of feed and discharge of the suspension are likewise constant and of such a magnitude that the suspended material continuously traverses the reactor vessel, there will exist a stationary state within the reactor vessel, wherein the concentration of the nuclear fuel suspension is uniform throughout the reactor vessel.

In the process according to the invention, two causes of the occurrence of inhomogeneities in the nuclear fuel suspension within the reactor vessel are practically avoided.

In the first place those convection currents which result from the vertical temperature drop across the reactor vessel are prevented, as the tendency of the carrier liquid to ascend when, in flowing through the reactor vessel, it gradually attains a higher temperature is not counteracted by the main current, as is the case when the suspension of nuclear fuel is led through the reactor vessel in downward direction.

In the second place, the occurrence of inhomogeneities resulting from the evolution of gas attendant on the nuclear fission reaction is prevented. Gas bubbles, e.g., consisting of the decomposition products of the moderating carrier liquid, mixed, in some cases, with gaseous fission products, naturally move in the same upward direction as the carrier liquid, on account whereof the gas bubbles cannot remain behind in the reactor vessel, which may happen with the process employing a downward flow of the nuclear fuel suspension.

The process according to the invention offers an important additional advantage. As the mean concentration of the nuclear fuel suspension within the reactor vessel is higher than the mean concentration of the suspension in the external parts of the suspension circuit, the inventory of fissile or fertile material contained, during operation of the nuclear reactor, in that part of the circuit outside the reactor vessel, is smaller than in the process using a downward suspension flow, as in the latter case the mean concentration of the nuclear fuel suspension within the reactor vessel is smaller than the mean concentration of the suspension in the external parts of the suspension circuit.

As a result, the inventory of fissile or fertile material which is at any moment outside the reactor vessel and does not take part in the nuclear fission reaction is—for given dimensions of the reactor vessel and of the external suspension circuit—as small as possible, which entails more economic use of the fissile or fertile material.

In the realization of the process according to the invention, special attention should be paid to the manner in which the nuclear fuel suspension is fed into and discharged from the reactor vessel. It is particularly the manner in which the feed takes place that is of critical importance.

Preferably, the nuclear fuel suspension is fed into the reactor vessel from a feed compartment located under the reactor vessel and having at its top substantially the same diameter as the reactor vessel, in a number of substantially vertical partial currents, e.g., through a network of substantially vertical partitions.

The feed compartment may comprise distributor elements which promote a good distribution of the infed suspension over the partial currents.

When the process according to the invention is applied it may happen that, as a result of a certain degree of unstableness of the ascending suspension, a slow circulation of the suspended material takes place in a vertical plane over the entire vertical cross-section of the reactor vessel. This particular phenomenon may be counteracted, while using a cylindrical reactor vessel, by imparting to the suspension flowing into the reactor vessel a slight rotary motion around the vertical axis of the reactor vessel. This may be attained, e.g., by using a set of horizontal, concentrical blade rings, at least part of the blades of which are set at an angle to the horizontal plane, the whole arragement being such that—taking into account also the feed rate of the suspension—the motion of the infed suspension remains substantially vertical.

It has been found that, if the suspension is given a slight rotary motion when it is fed into the reactor vessel, still better results can be obtained if care is taken that the resistance experienced by the suspension in entering the reactor vessel slightly increases as the distance to the axis of the reactor vessel decreases.

This may be attained, when applying a set of horizontal concentrical blade rings as described above, by providing at least some of the blades—all having the same angle of inclination—with openings, in such a way that the mean number fo openings per blade increases in the direction from the periphery towards the centre.

The discharge of the nuclear fuel suspension from the reactor vessel should be of such kind, that induced circulation currents inside the reactor vessel are avoided. The simplest way of attaining this is to make the upper end of the reactor vessel conical, which may, if desired, be done by means of guide planes or guide bodies. It is also possible to have the discharge take place through a number of concentrical ring-shaped discharge conduits, or through a number of pyramid-shaped discharge conduits joined in a honeycomb pattern.

The invention will be further illustrated with reference to the accompanying drawings.

FIG. 1 is a diagram of an operative homogeneous nuclear reactor assembly for realizing the present process.

FIGURE 2 is a schematic view showing the lower portion of the nuclear reactor of FIGURE 1 provided with devices for effecting a suitable distribution of the infed suspension over a network of vertical partitions.

FIGURE 3 is a schematic view showing the upper portion of the nuclear reactor of FIGURE 1 including devices for effecting a smooth discharge of the suspension of the nuclear fuel from the reactor vessel.

FIGURE 4a illustrates an embodiment of a different type of element that can be used to relpace the network of partitions in FIGURE 1.

FIGURE 4b are developments of the blade rings of FIGURE 4a.

FIGURE 4c is also a development of the blade rings of FIGURE 4a and illustrates a different type of blade ring from FIGURE 4b.

Within the neutron reflector 1 there is the reactor vessel, consisting of a cylindrical part 2 with a vertical inner wall and a superposed conical part 3. Under the reactor vessel there is a concentrical conical feed compartment 4, separated from the reactor vessel by a network of vertical partitions 5.

By means of a pump 6 a suspension of uranium oxide or a similar fissile material in a moderating carrier liquid, such as common or heavy water, is circulated successively through the reactor vessel, a discharge conduit 7, a heat exchanger 8, a conduit 9, a centrifugal separator 10 where gas is separated out, a feed conduit 11, the feed compartment 4 and the network of partitions 5, in such a way that within the reactor vessel the amounts of fissile material and moderator are critical, the carrier liquid flows upwards free of turbulence, and the suspended particles can freely settle with respect to the carrier liquid.

In the heat exchanger 8, the heat developed by the nuclear fission is transferred from the circulating suspension to a fluid introduced through conduit 12 and discharged through conduit 13, which fluid may circulate through a suitable apparatus for utilizing the energy recovered (not shown).

In the gas separator 10, the decomposition products of the common or heavy water formed within the reactor vessel are separated from the circulating suspension and led, through a conduit 14, to an apparatus 15, where they are recombined, e.g. by means of a catalyst. The resulting common or heavy water vapour is then led through conduit 16 to a condenser 17, after which the resulting common or heavy water is returned to the suspension circuit through conduit 18 with control valve 19.

Through a conduit 20 with control valve 21 part of the circulating suspension may be led to the hydrocyclone thickener 22. Here the larger portion of the carrier liquid is separated from the infed suspension and passed, through conduit 23, to the purification station 24, where the separated carrier liquid is freed of dissolved fission products, e.g., by means of an adsorbent. The thickened suspension leaving the hydrocyclone 22 flows through conduit 25 and is subsequently added, in the mixing device 26, to the purified carrier liquid from the purifying station 24. The resulting suspension of original concentration is then returned into the suspension circuit through conduit 27.

Through conduit 28 with valve 29 the suspension of nuclear fuel may in an emergency be drained from the system.

In FIGURE 2, the feed compartment 4 contains a rotation-symmetrical distributor body 40, fixed by means of the supports 41, of such shape that a peripheral space 42 and a central channel 43 are formed. At the top this device adjoins a central supporting element 44 and a number of secondary guide partitions 45.

In FIGURE 3, the conical upper part 3 of the reactor vessel contains a coaxially positioned rotation symmetrical displacement body 50 having the shape of a double cone and fixed by means of supports 51.

In FIGURES 4a, 4b and 4c, two embodiments are shown of an element that can be used to replace the network of partitions 5 of FIGURE 1, with the object of imparting a slight rotary motion to the nuclear fuel suspension when it enters the reactor vessel, so that the nuclear fuel suspension flow will be more stable within the reactor vessel.

In its simplest form, as shown in top view in FIGURE 4a and developed in FIGURE 4b, this element consists of a set of concentrical blade rings 61, 62, 63 and 64, provided at their lower sides with perforated plates 65, 66, 67 and 68, respectively, in order to obtain a sufficiently high flow resistance.

Better results may be obtained with a similar set of concentrical blade rings shown as developed in FIGURE 4c. In this set the blades of the innermost rings are provided with openings, in such a way that the smaller the ring is, the more openings there are, so that the mean number of openings per blade increases in the direction from the periphery towards the centre, as a result whereof the resistance experienced by the suspension in entering the reactor vessel gradually increases as the distance to the axis of the reactor vessel decreases.

I claim:
1. Process for the establishment of a self-sustaining nuclear fission reaction, comprising circulating the nuclear fuel, in the form of a rapidly settling suspension of a solid, fissile material in a carrier liquid in a continuous upward flow through a nuclear reactor vessel with substantially vertical inner walls, avoiding turbulence in the carrier liquid and permitting the suspended solid particles to freely settle with respect to the ascending carrier liquid and feeding the nuclear fuel suspension into the reactor vessel in a plurality of substantially vertical partial currents.

2. Process according to claim 1, wherein a cylindrical reactor vessel is used and there is imparted to the suspension flowing into the reactor vessel, a slight rotary motion around the axis of the said vessel.

3. Process according to claim 1, wherein the nuclear fuel suspension is a suspension of uranium oxide in water.

References Cited in the file of this patent

UNITED STATES PATENTS

| | | |
|---|---|---|
| 2,736,696 | Wigner | Feb. 28, 1956 |
| 2,743,225 | Ohlinger et al. | Apr. 24, 1956 |
| 2,758,023 | Bareis | Aug. 7, 1956 |

FOREIGN PATENTS

| | | |
|---|---|---|
| 1,105,731 | France | Dec. 7, 1955 |

OTHER REFERENCES

CF-54-6-180, pub. by U.S. Atomic Energy Commission, June 23, 1954, by Sidney Visner, pp. 1-7.

Nuclear Engineering, Part II, published by American Institute of Chemical Engineering, 25 West 45th Street, N.Y. 36, N.Y., pp. 120-126. Library date February 7, 1955.

Proceedings of the International Conference on the Peaceful Uses of Atomic Energy, held in Geneva, August 8-August 20, 1955, vol. 3, Power Reactors, United Nations, N.Y. 1955, pp. 116-124.